(12) United States Patent
Townsend et al.

(10) Patent No.: US 7,765,668 B2
(45) Date of Patent: Aug. 3, 2010

(54) AUTOMATED PALLET INSPECTION AND REPAIR

(75) Inventors: Steve Townsend, Chatswood (AU); Michael David Lucas, Chatswood (AU)

(73) Assignee: Chep Technology Pty Limited, Sydney (AU)

( * ) Notice: Subject to any disclaimer, the term of this patent is extended or adjusted under 35 U.S.C. 154(b) by 1443 days.

(21) Appl. No.: 10/538,019

(22) PCT Filed: Dec. 10, 2003

(86) PCT No.: PCT/AU03/01652

§ 371 (c)(1), (2), (4) Date: Jun. 7, 2005

(87) PCT Pub. No.: WO2004/052739

PCT Pub. Date: Jun. 24, 2004

(65) Prior Publication Data

US 2006/0242820 A1 Nov. 2, 2006

(30) Foreign Application Priority Data

Dec. 10, 2002 (AU) .............................. 2002953248
Dec. 20, 2002 (AU) .............................. 2002953466

(51) Int. Cl.
*G01M 19/00* (2006.01)
*B23P 21/00* (2006.01)
(52) U.S. Cl. .............. 29/407.04; 29/402.01; 29/407.01; 29/407.05; 29/407.09
(58) Field of Classification Search .............. 29/402.01, 29/407.01, 407.05, 407.09, 407.1, 702, 703, 29/705, 772, 407.04
See application file for complete search history.

(56) References Cited

U.S. PATENT DOCUMENTS

| 4,346,506 | A | * | 8/1982 | Martindale | .................. 29/239 |
| 4,743,154 | A | * | 5/1988 | James et al. | ............. 414/788.5 |
| 4,807,991 | A | * | 2/1989 | Carew | ......................... 356/72 |
| 5,096,369 | A | * | 3/1992 | Ouellette | ................. 414/788.7 |
| 5,297,059 | A | * | 3/1994 | Kawasoe | .................... 702/121 |
| 6,079,939 | A | * | 6/2000 | Smets | .................... 414/798.5 |
| 6,522,993 | B1 | * | 2/2003 | Tomko | ....................... 702/150 |

(Continued)

FOREIGN PATENT DOCUMENTS

EP 473363 A2 * 3/1992

(Continued)

*Primary Examiner*—Essama Omgba
(74) *Attorney, Agent, or Firm*—Allen, Dyer, Doppelt, Milbrath & Gilchrist, P.A.

(57) ABSTRACT

An automatic pallet inspection cell (10) comprises one or two multi axis robot arms (14, 15) which terminate in either internal or exterior pallet grippers. The robots are used to transport a gripped pallet (12) through an automated inspection station (16) which compiles a three dimensional data map of a pallet surface. A processor interprets the map and producing a recipe for the robot or robots. One or more stations (17, 18, 19) conduct pallet repair operations that are specified by the recipe. A method for levelling a pallet prior to board removal by a band saw (17) is also disclosed, characterised by rolling the pallet relative to a blade of the band saw to a first and a second roll angle, and positioning the pallet at a position which is an average of the first and second roll angles.

11 Claims, 16 Drawing Sheets

U.S. PATENT DOCUMENTS

| | | | |
|---|---|---|---|
| 6,687,970 B2 * | 2/2004 | Waechter et al. | 29/426.4 |
| 6,700,563 B1 * | 3/2004 | Koizumi | 345/156 |
| 6,701,615 B2 * | 3/2004 | Harding et al. | 29/889.1 |
| 6,884,999 B1 * | 4/2005 | Yedur et al. | 850/33 |
| 6,888,544 B2 * | 5/2005 | Malzbender et al. | 345/423 |
| 6,892,592 B2 * | 5/2005 | Gatteschi | 73/865.8 |
| 6,912,762 B2 * | 7/2005 | Lile et al. | 29/33.52 |
| 6,969,821 B2 * | 11/2005 | Mika et al. | 219/121.83 |
| 7,130,726 B2 * | 10/2006 | Steinmeier et al. | 701/29 |
| 7,340,971 B2 * | 3/2008 | Carter et al. | 73/865.9 |
| 7,360,427 B2 * | 4/2008 | Drinkwater et al. | 73/635 |
| 2006/0082590 A1 * | 4/2006 | Stevick et al. | 345/587 |
| 2007/0107212 A1 * | 5/2007 | Holliger | 29/772 |
| 2007/0143979 A1 * | 6/2007 | Townsend et al. | 29/402.01 |
| 2007/0163099 A1 * | 7/2007 | Townsend et al. | 29/402.01 |
| 2007/0213942 A1 * | 9/2007 | Ponson et al. | 702/36 |
| 2007/0299338 A1 * | 12/2007 | Stevick et al. | 600/425 |

FOREIGN PATENT DOCUMENTS

| | | |
|---|---|---|
| EP | 0 823 629 A | 2/1998 |
| WO | WO 9512107 A1 * | 5/1995 |
| WO | WO 99/04926 A | 2/1999 |

* cited by examiner

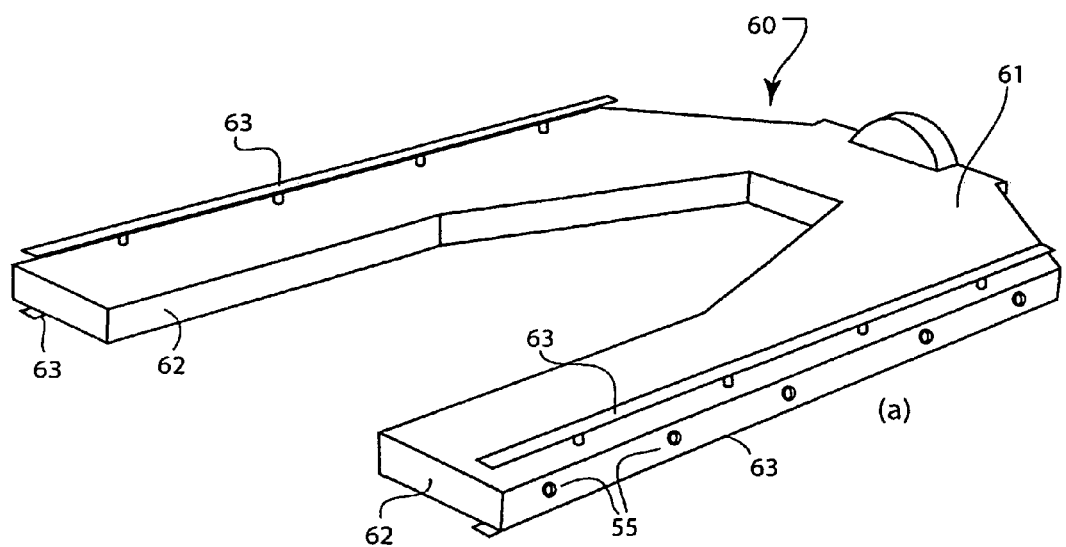
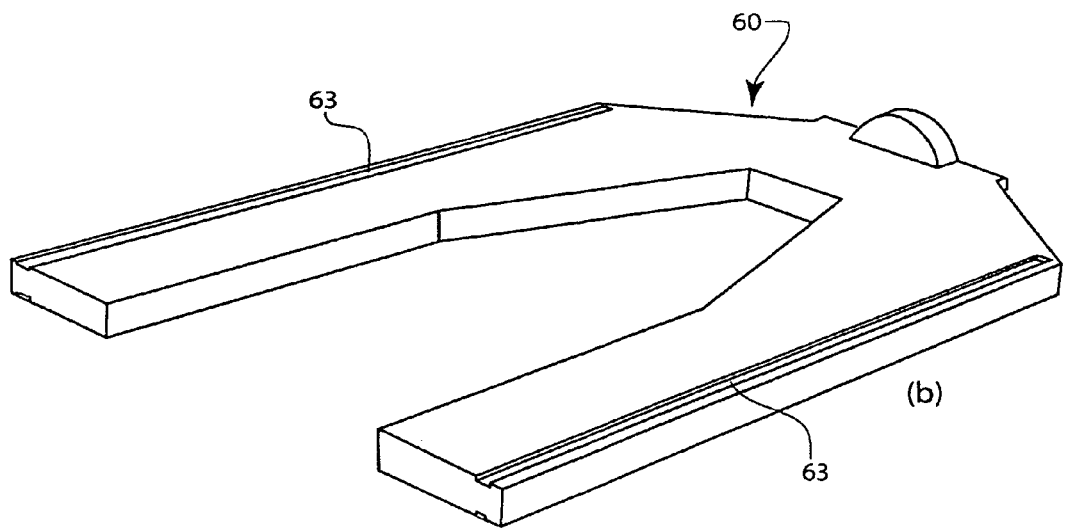
Fig. 6

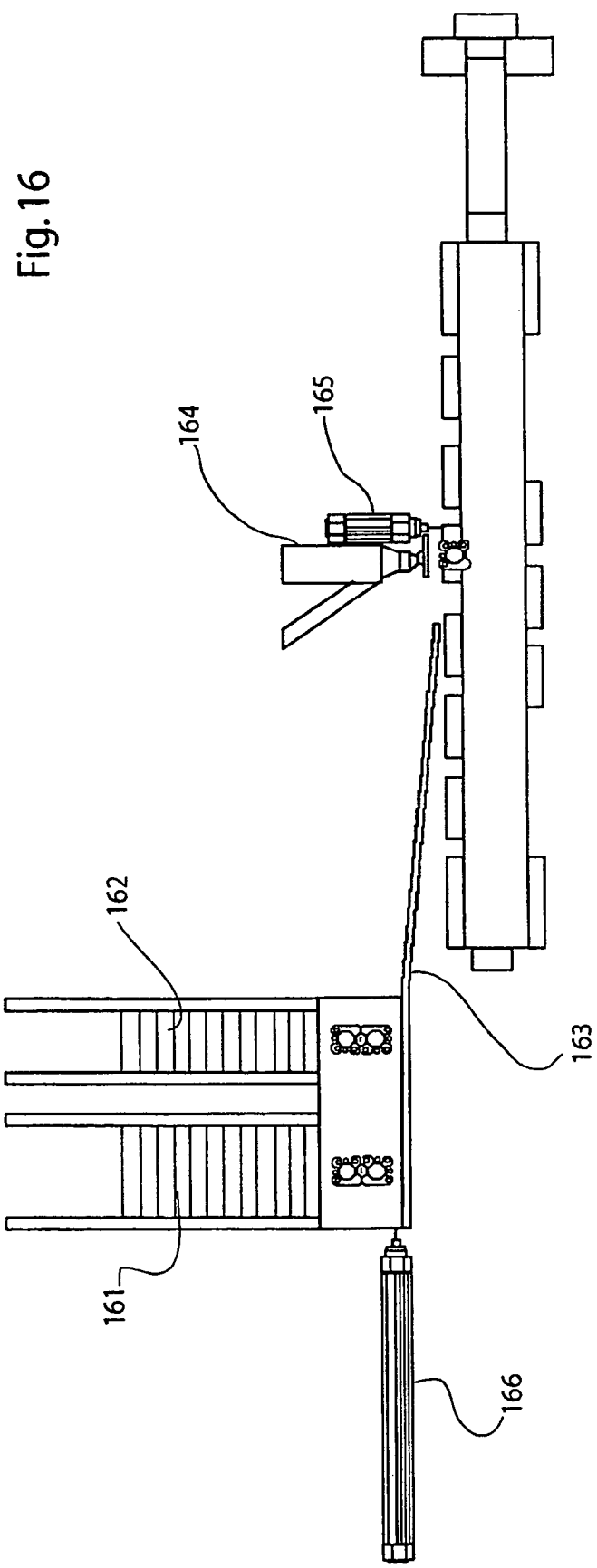

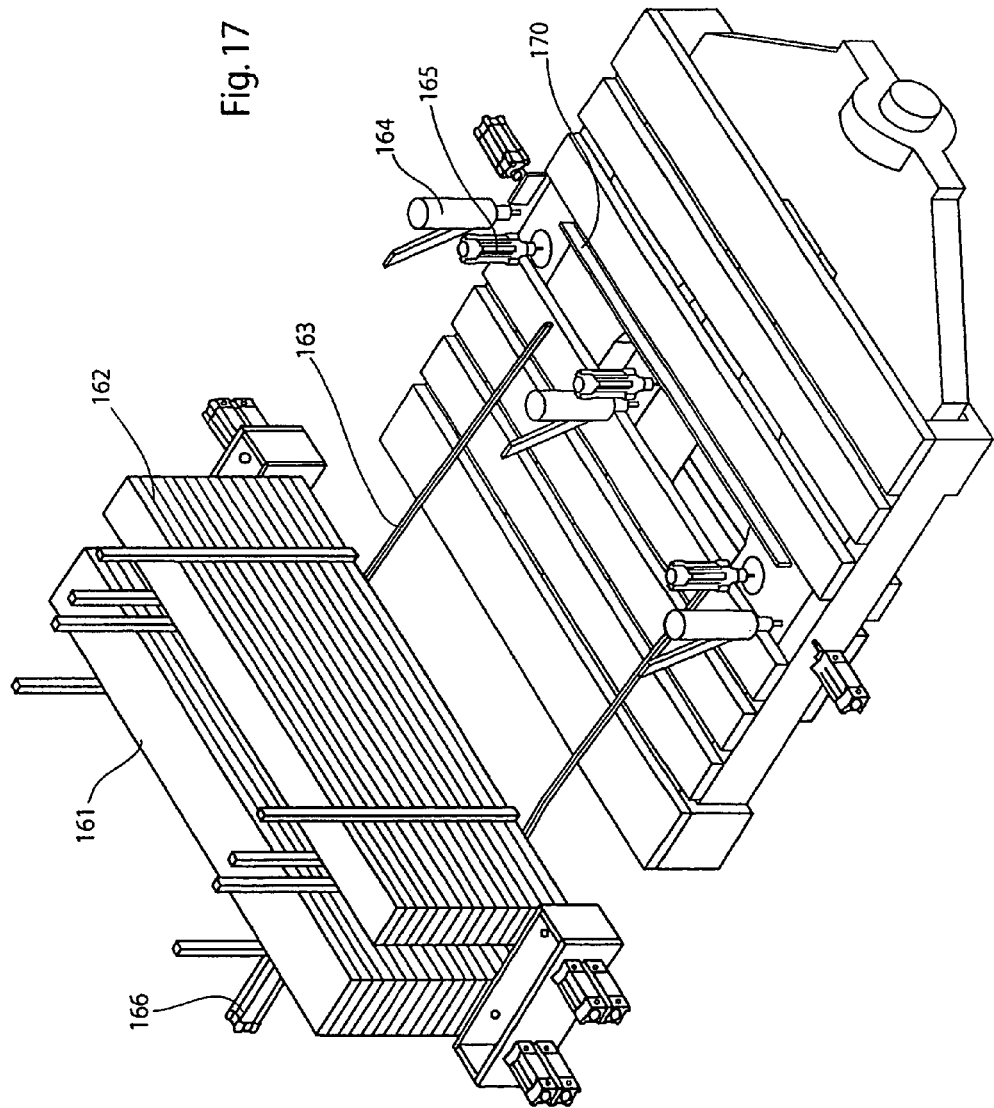

AUTOMATED PALLET INSPECTION AND REPAIR

FIELD OF THE INVENTION

The invention pertains to pallet repair and more particularly to the automated inspection and repair of pallets, especially timber pallets. It will be appreciated that the teachings of the present invention may be extended to a variety of pallet styles. It will also be appreciated that the various inspection and repair devices and methods disclosed below are capable of separate use each having utility without the other, but being particularly useful when used in any of various combinations.

BACKGROUND OF THE INVENTION

Timber pallets may be constructed in two basic styles, the first being made up of three (or more) bearers or stringers, with boards running across the top and bottom of these to make up a deck for supporting products. Boards are generally nailed on to the bearers, but may be screwed on or attached by other methods. The first and last boards on a given side are referred to as lead boards. The second style is similar but has blocks and connector boards in place of the bearers. Pallets of both styles may be constructed in a variety of sizes depending on their use and geographic location. Pallets may also be constructed in other materials, such as plastic, metal, composite materials or a combination of materials.

Pallets (of any style) can be repaired when damaged. This repair traditionally requires manual handling and inspection by an operator, with mechanised systems available for moving the pallet to and from the human operator who completes the repair of the pallet. Additionally, there is sometimes a separate requirement for pallets (of any style) to be inspected against standards and quality criteria to determine that they are fit for use—this is also currently a manual process.

OBJECTS AND SUMMARY OF THE INVENTION

It is an object of the invention to provide devices and methods for the automated inspection and repair of wooden pallets.

Accordingly, the invention provides various devices and methods for the automated inspection and repair of pallets. In preferred embodiments, a pallet is retained by an internal or external gripping device. The gripping device is designed to give access to the repairable areas of the pallet. A robot uses the gripping device to move the pallet from one station to the next. Each station performs an operation required for inspection or repair.

BRIEF DESCRIPTION OF THE DRAWING FIGURES

In order that the invention is better understood, reference is now made to the following drawing figures in which.

Figure 1:
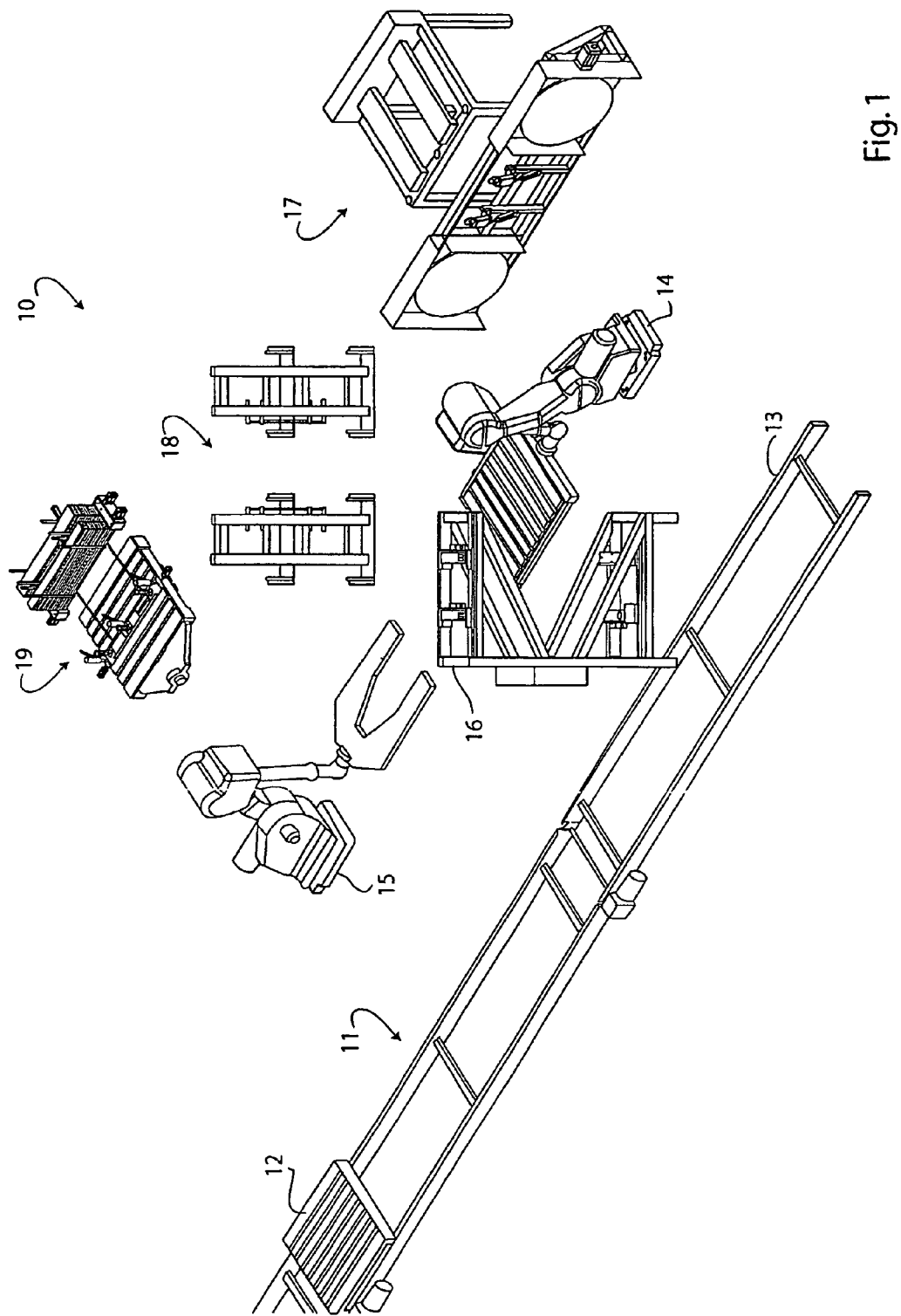
FIG. 1 is a perspective view of an automated inspection and repair cell.
Figure 7:
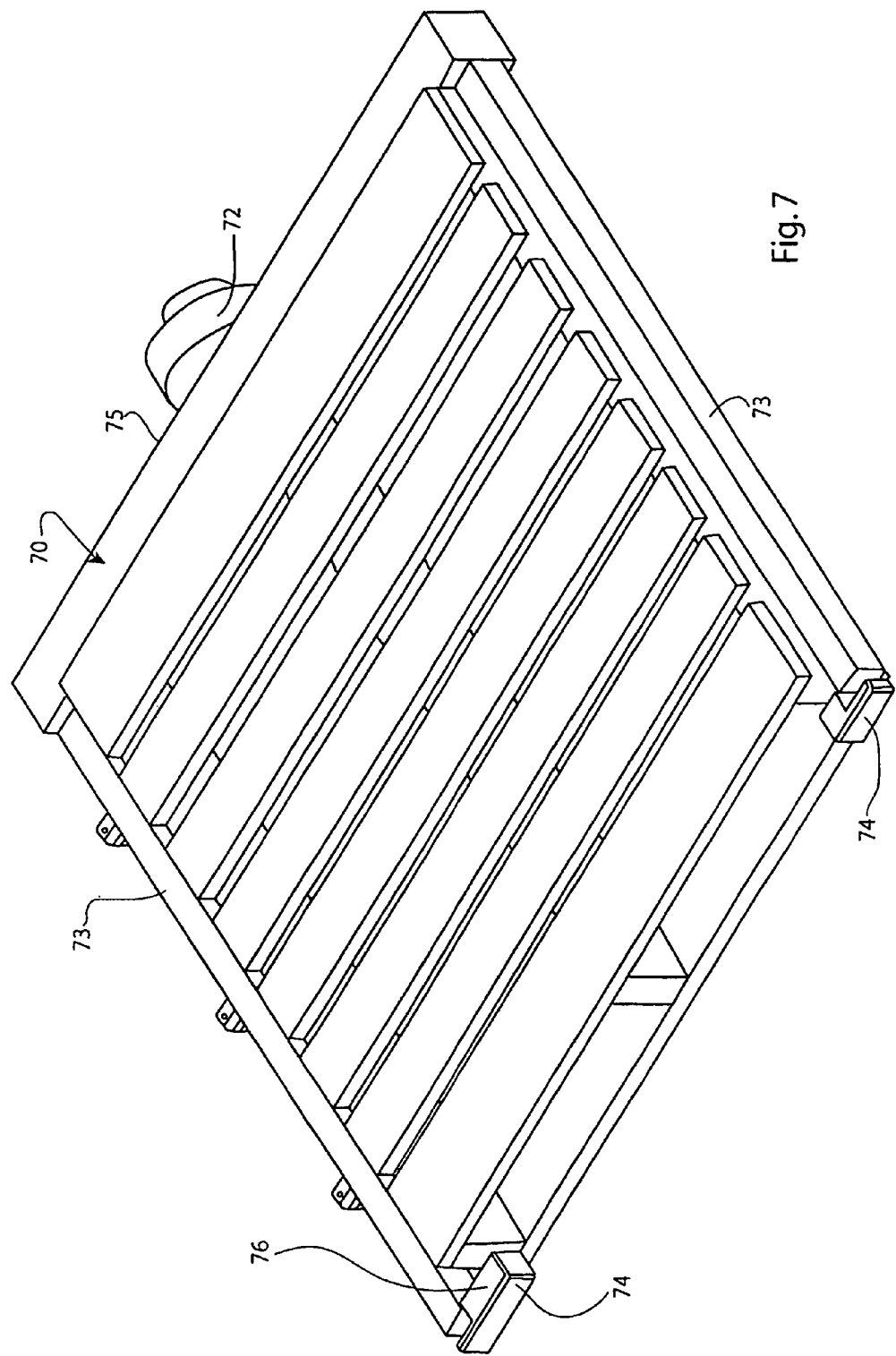
Figure 8:
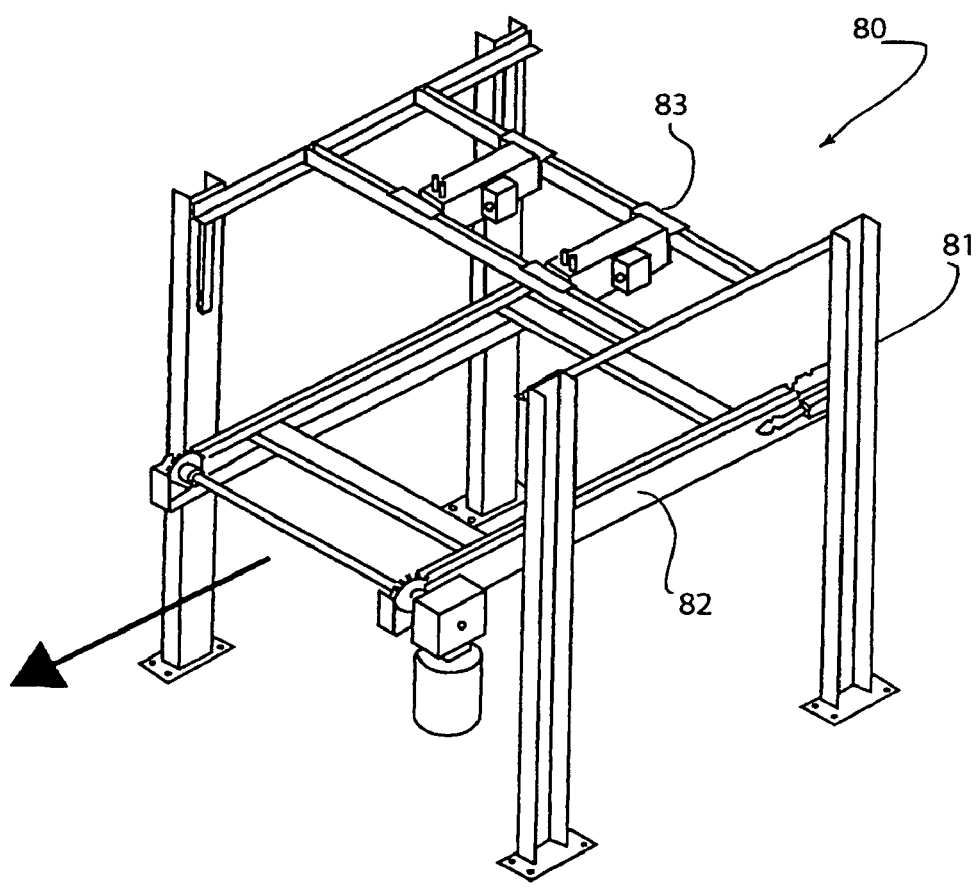
Figure 9:
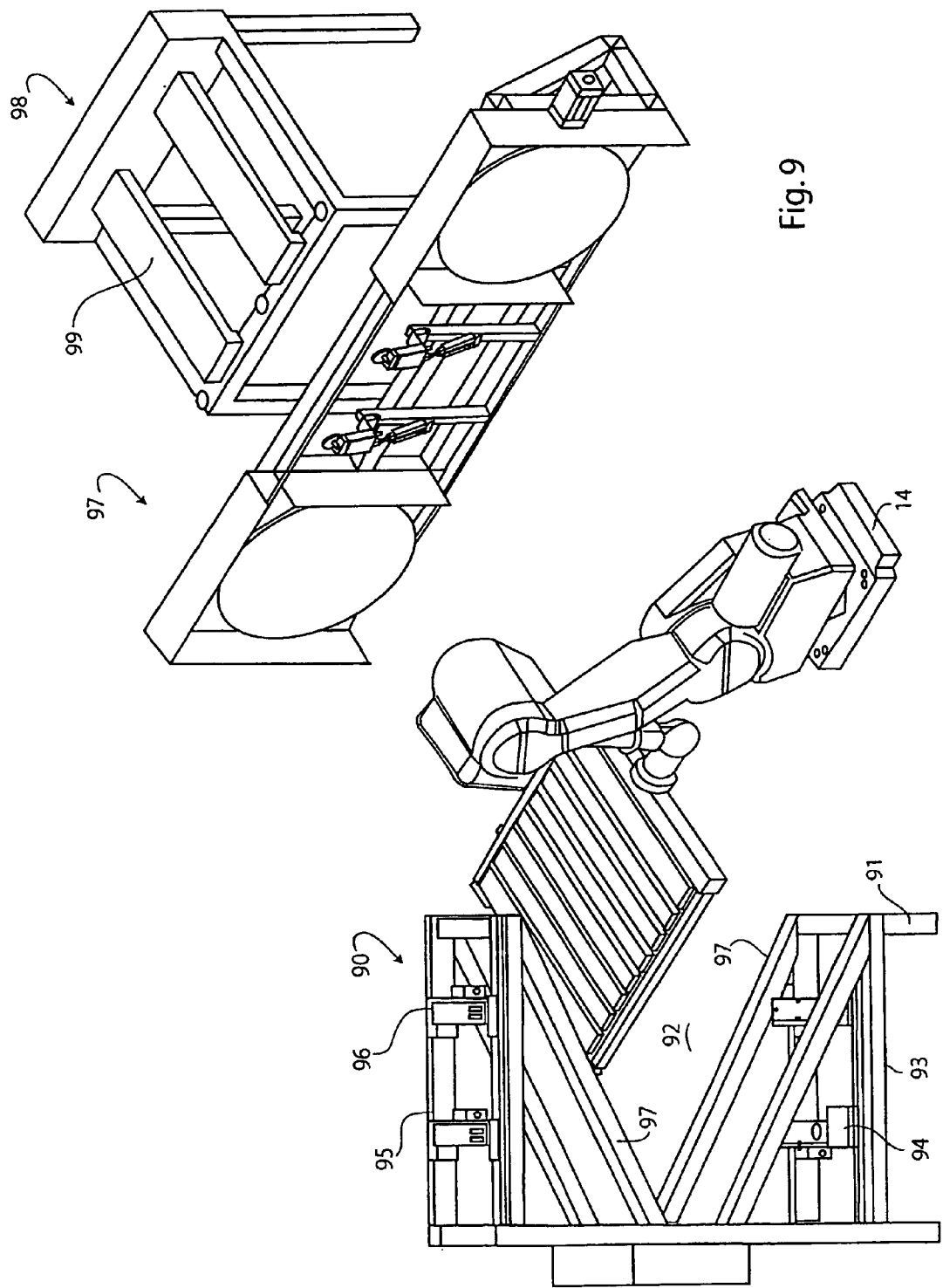
Figure 10:
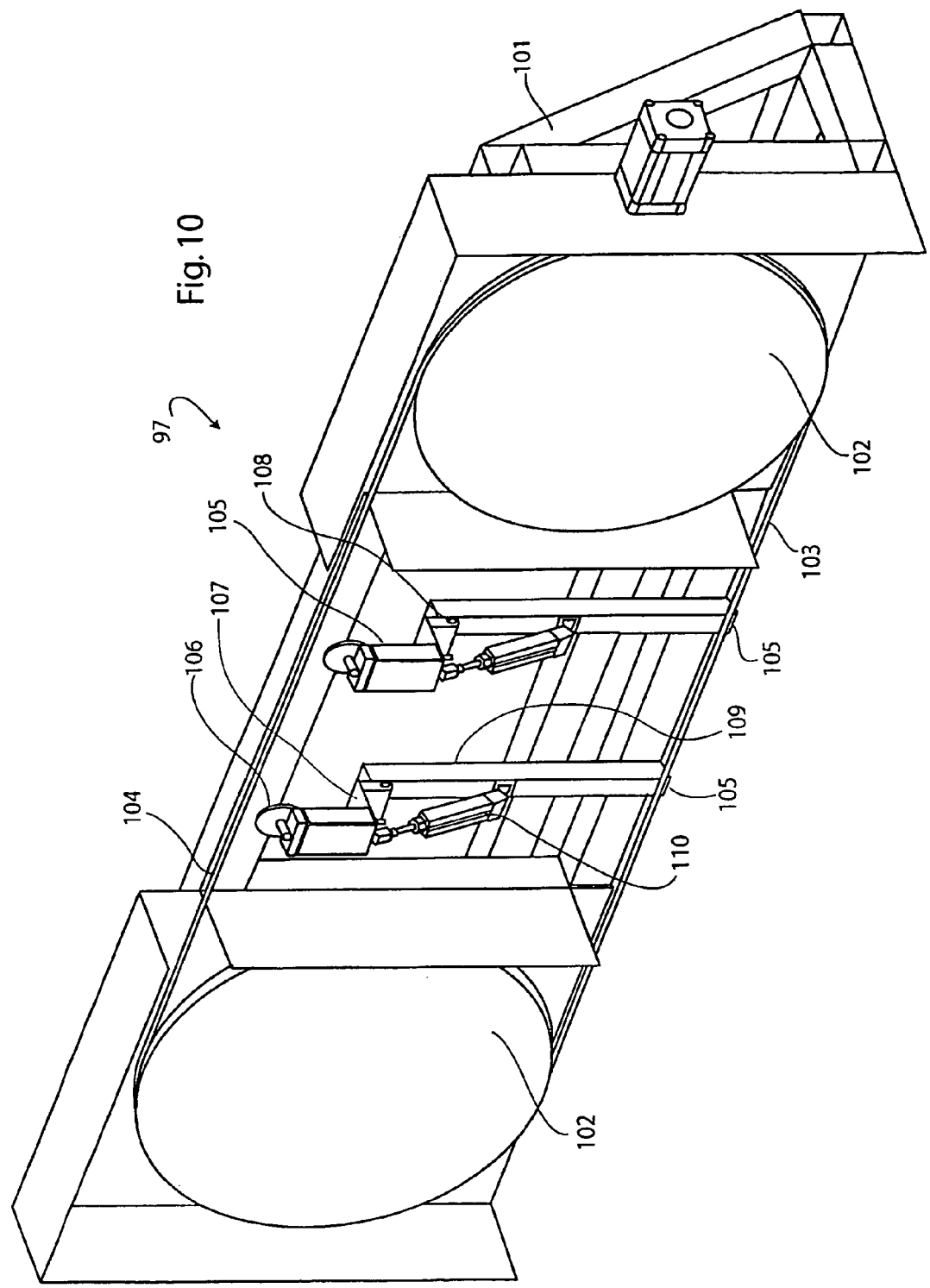
Figure 11:
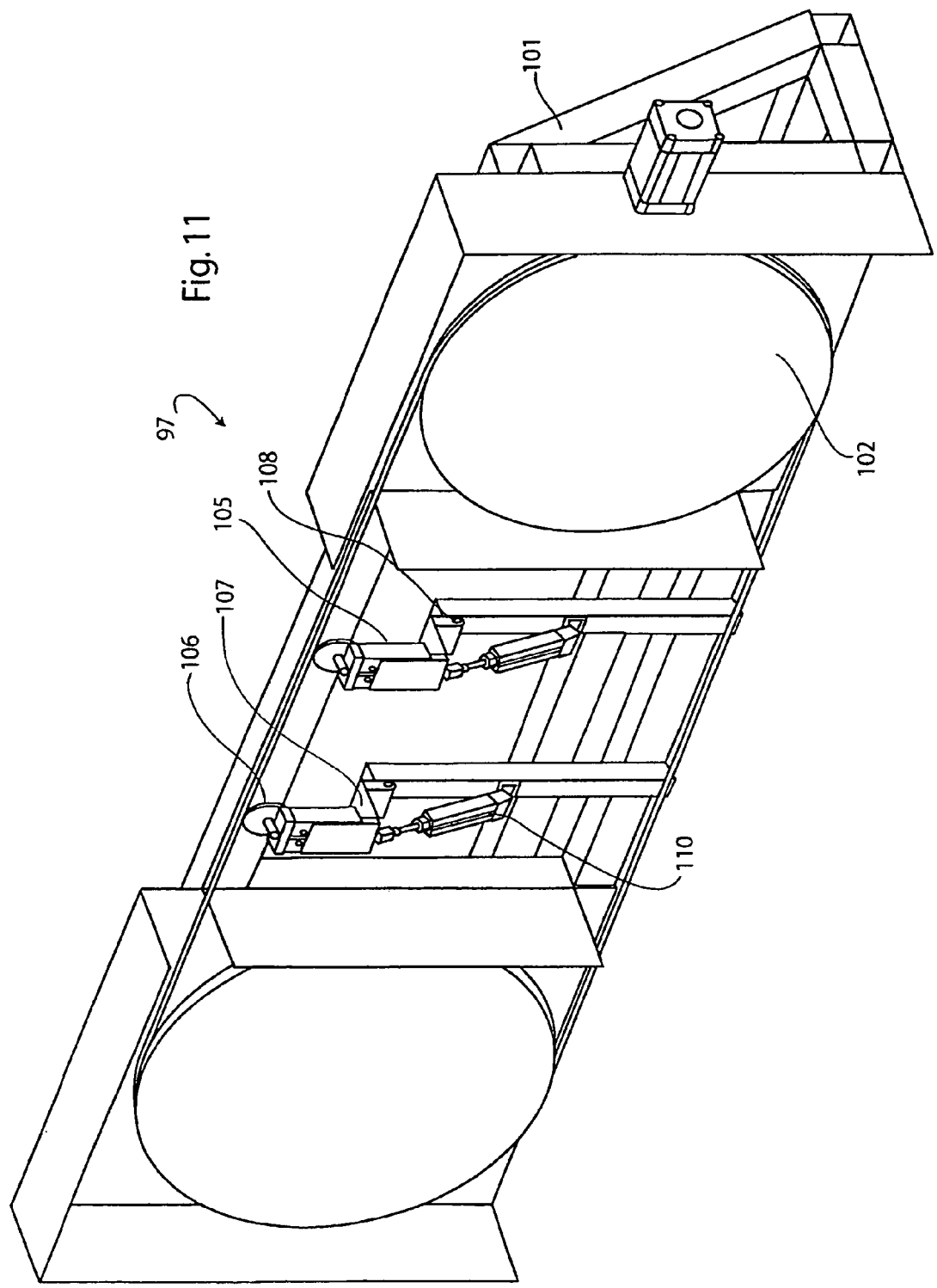
Figure 12:
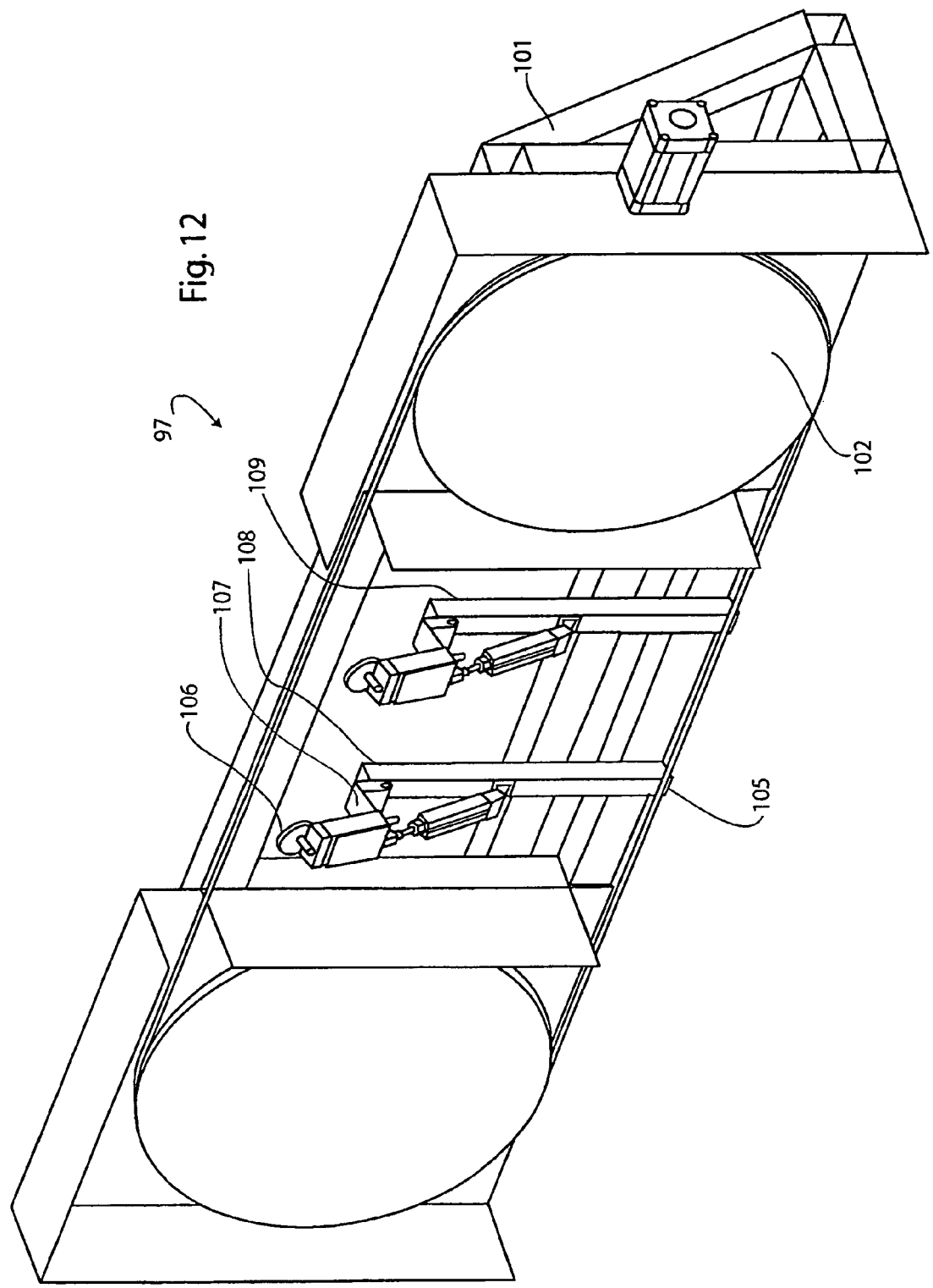
Figure 13:
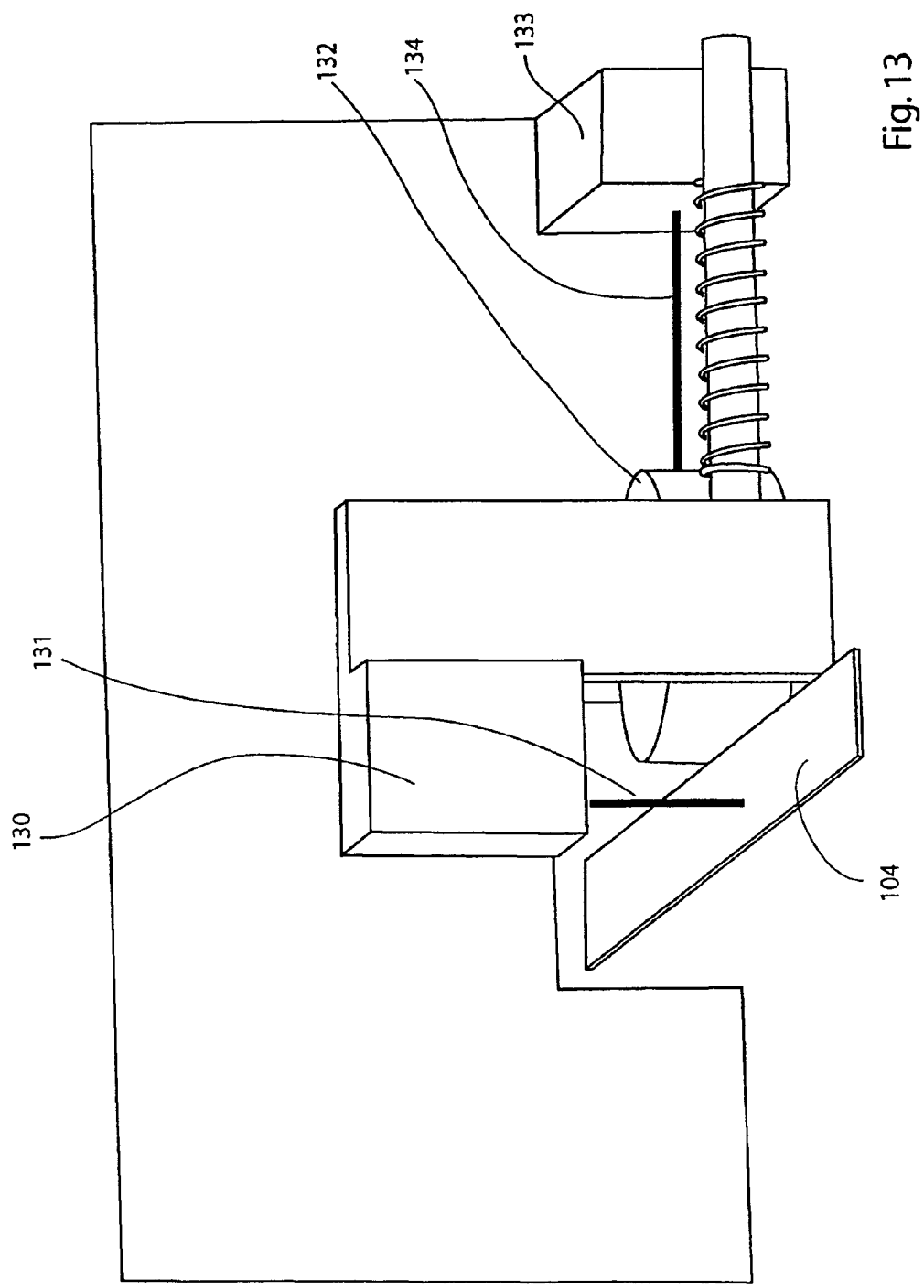
Figure 14:
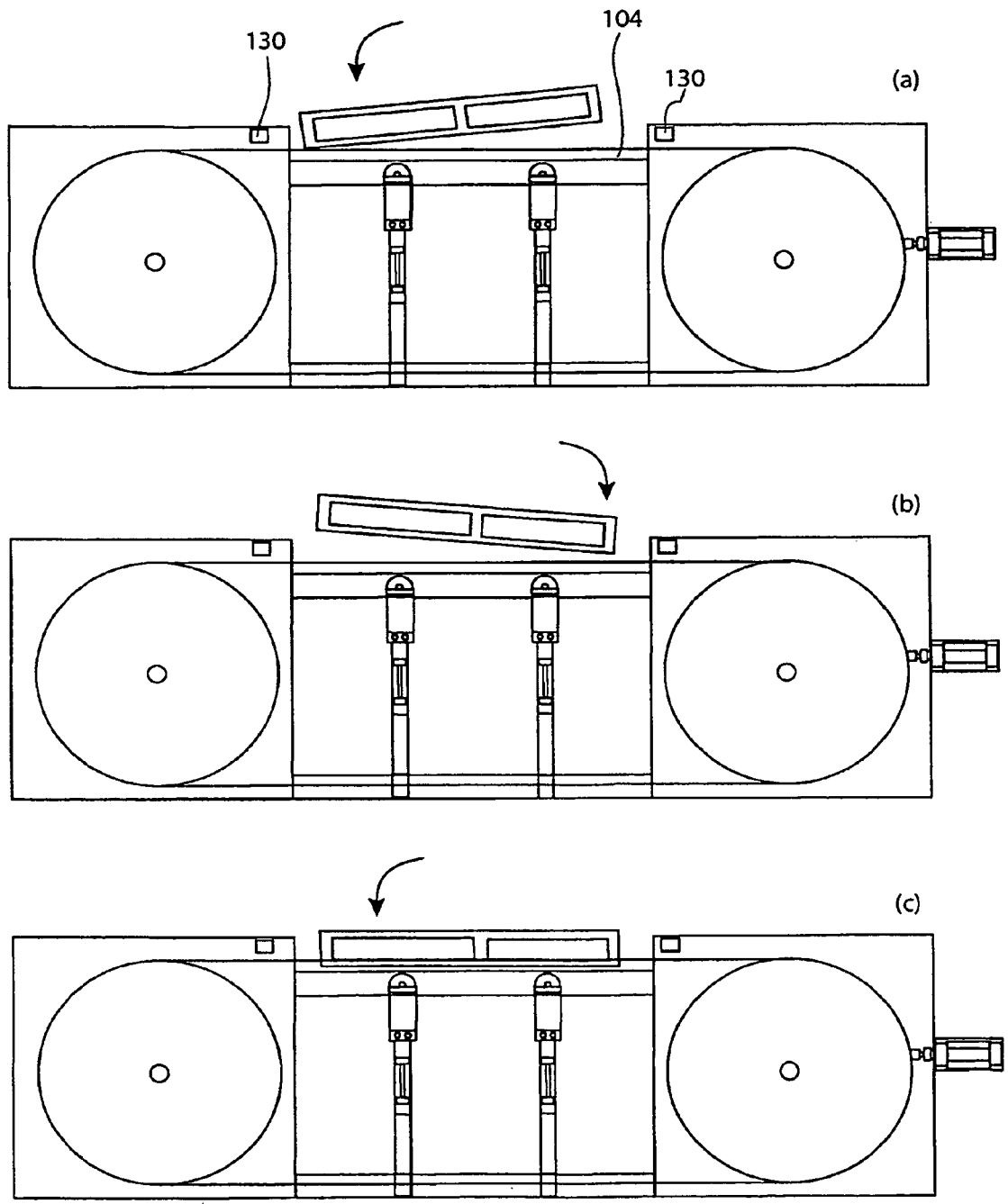
Figure 15:
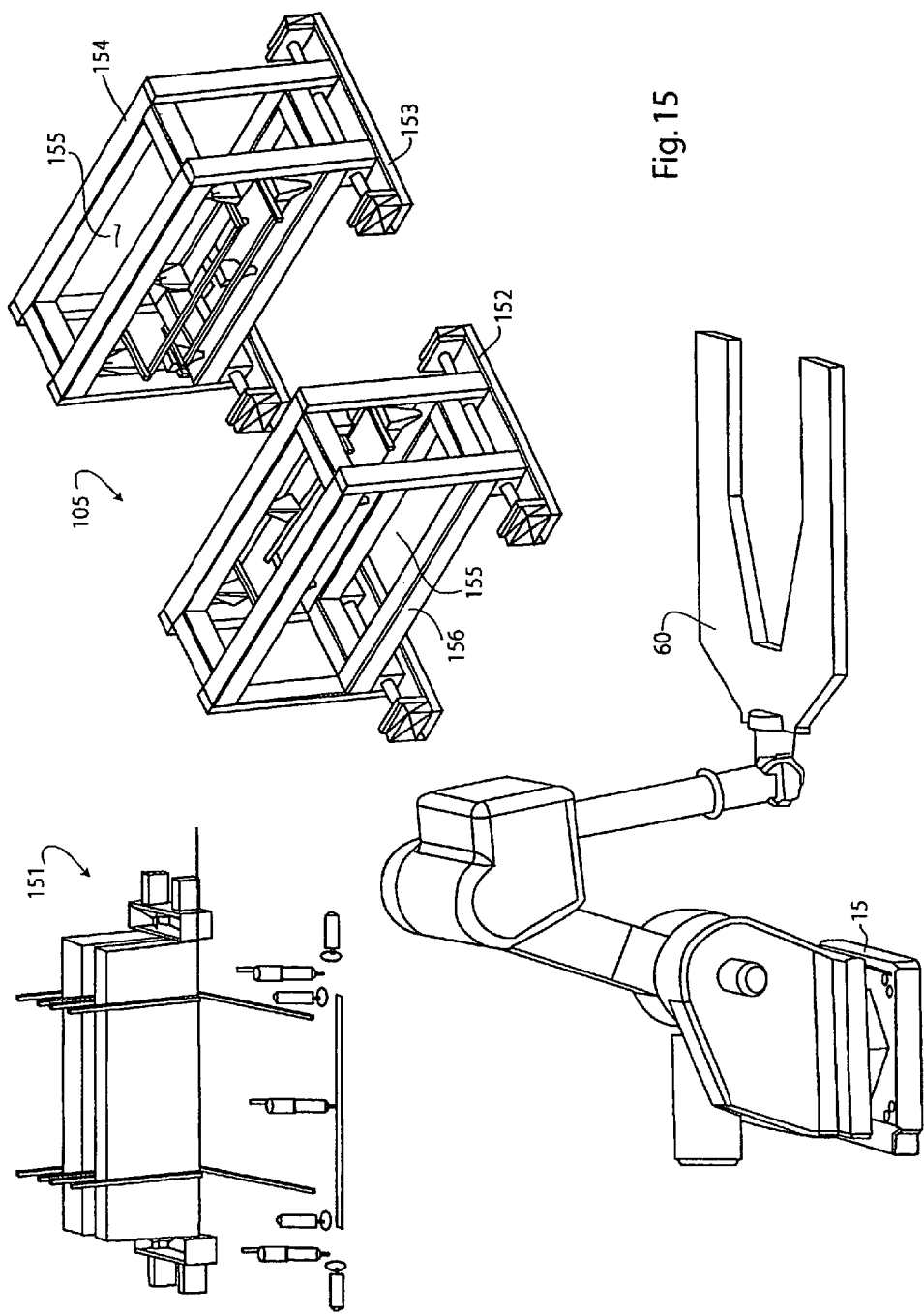

FIGS. 6(*a*) and 6(*b*) are perspective views of an internal gripper;

FIG. 7 is a perspective view of an external gripper;

FIG. 8 is a perspective view of an inspection table;

FIG. 9 is a perspective view of a portion of the cell shown in FIG. 1;

FIG. 10 is a perspective view of a board removal saw;

FIG. 11 is another perspective view of a board removal saw;

FIG. 12 is yet another perspective view of a board removal saw;

FIG. 13 is a perspective view of blade position sensors in a board removal saw;

FIGS. 14(*a*)-(*c*) are elevations of a board removal saw showing pallet positioning prior to a cutting operation;

FIG. 15 is a perspective view of another portion of the cell shown in FIG. 1;

FIG. 16 is a side elevation of a board replacement machine; and

FIG. 17 is a perspective view of a board replacement machine.

BEST MODE AND OTHER EMBODIMENTS OF THE INVENTION

Overview

As shown in FIG. 1, an example of a robotic work cell for inspecting and repairing pallets 10 comprises an input conveyor 11 which delivers pallets 12 to an unloading area 13. The optional conveyor 11 is capable of assuming a number of different forms and styles. In this example, the inspection and repair cell 10 includes a first robot 14 and a second robot 15. The two robots 14, 15 work together to transport a pallet through a number of stations. Each station performs one or more operations which are required during the inspection and repair process. In some embodiments of the invention, a single robot placed centrally within a cell, or circuit of stations (see FIG. 2) is capable of transporting a pallet through the entire inspection and repair cycle. In the example of FIG. 1, the first robot 14 transports a pallet through an automated inspection device 16 and a damaged board removal saw 17 before handing the pallet over to the second robot 15. The second robot 15 inserts the same pallet into a lead board adjustment station 18 and a board replacement station 19 before loading the pallet onto a second conveyor or etc. (not shown) for removal of the inspected and repaired from the cell.

Figure 2:
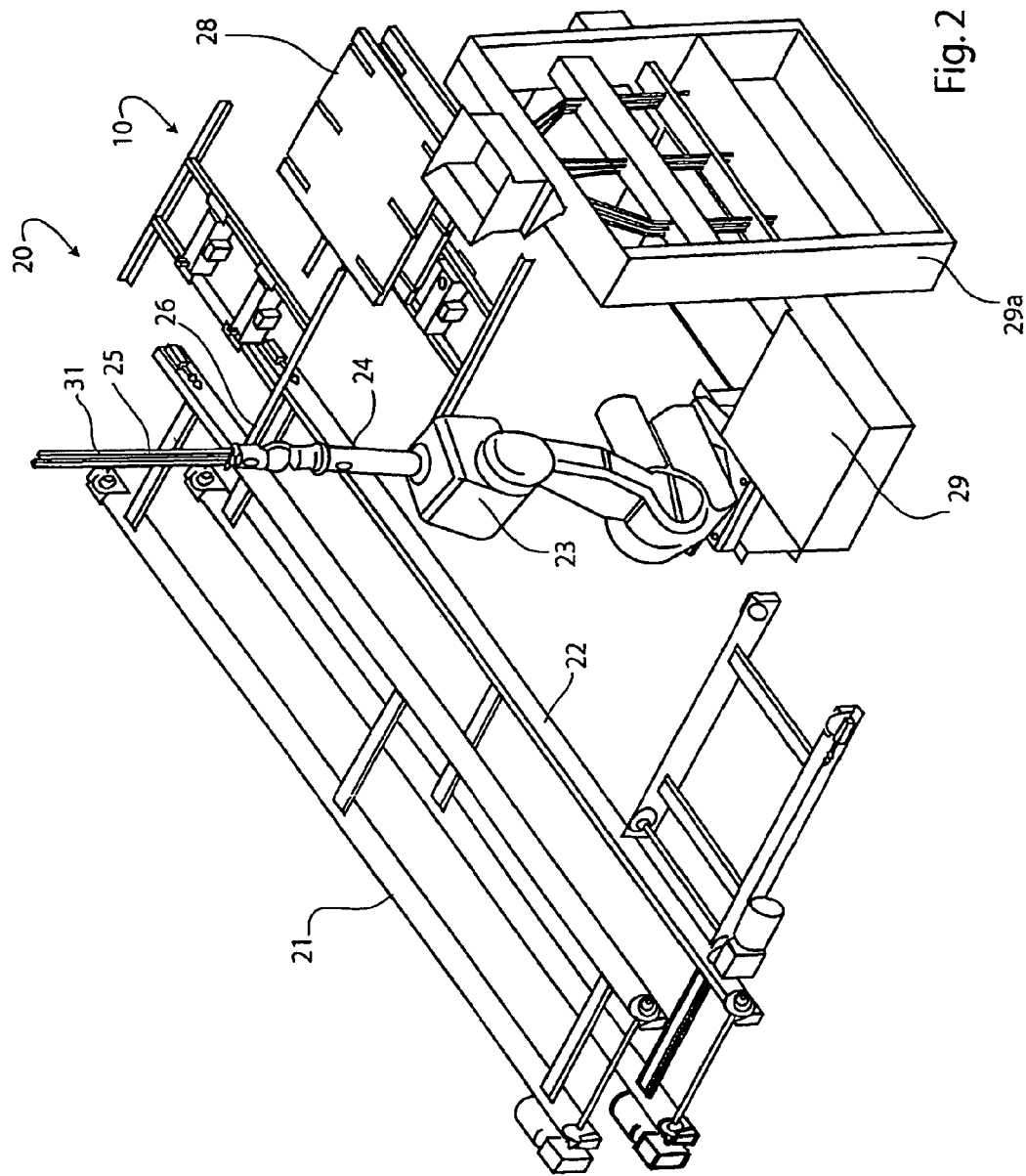
FIG. 2 is a perspective view of a different inspection and repair cell having various stations.

As shown in FIG. 2, a pallet may arrive at a basic or single robot inspection and repair cell 20, by any means (eg forklift, conveyor, pallet dispenser). This repair cell may take a number of configurations but in this particular embodiment the cell is essentially a continuous circuit which begins on the input conveyor 21 and ends on the output conveyor 22. When the pallet has arrived at the cell it must be gripped before further operations to take place. Gripping is accomplished with a robotic style arm 23 which may be equipped with a machine detectable reference point (or datum) 24. This machine detectable reference point may be replaced by a datum generated by the software. The arm 23 terminates in wrist joint and a gripping device or appliance 25. The gripping appliance 25 may have its own datum 26, which in some embodiments is the only datum. This single robot cell includes a lead board adjustment station 28, a board removal station 29 and a board replacement station 29*a*.

Gripping a Pallet

Gripping the pallet continuously throughout the automated inspection and repair process has several advantages. By "continuously" we include a hand-off between two or more robots where the orientation datum is preserved. First, gripping the pallet such that all elements of the pallet are, from that point onward, in a fixed location relative to at least one datum provides a convenient way of locating the pallet and its features, in space, throughout the entire inspection and repair process or circuit. This allows the pallet to be mapped and the pallet's features to be recorded to, for example, a database. Control over the inspection and repair process is possible because each recordable feature has a reference to a datum which can be read, whenever required, to locate the pallet relative to a particular workstation, inspection station, or repair station. Second, gripping provides a secure way of handling the pallet, making both sides of the pallet potentially accessible in a way which does not interfere with either inspection or repair.

In one preferred embodiment, the gripper is attached to a manipulating device such as a robotic arm that can move the gripped pallet through space in any direction and at any angle. This may be a multi-axis robotic arm (FIGS. 1 and 2), or any device for translating and rotating the gripped pallet. The robot arm or manipulating device may be fixed or on rails or tracks. It may be vertical or horizontal or at any angle, and may be attached to the walls, a pedestal, the floor, ceiling, overhead or suspended structures or a combination of these. The gripper may be permanently attached to the manipulating device, or it may be able to detach and reattach at various points in the repair cell if needed, to allow the manipulating device to work with multiple pallets. In all cases, the gripper must be small and thin enough to not impede access to the deck boards on the pallet, however it must be strong enough to hold the pallet against high inertial forces when moved between sections of the repair cell. The gripper may have sensing devices installed to check that a pallet has been successfully gripped. The gripping device, if detachable, must have a locking mechanism so that it stays closed and gripping even when disconnected from the arm or device which manipulates it.

Figures 3, 4:
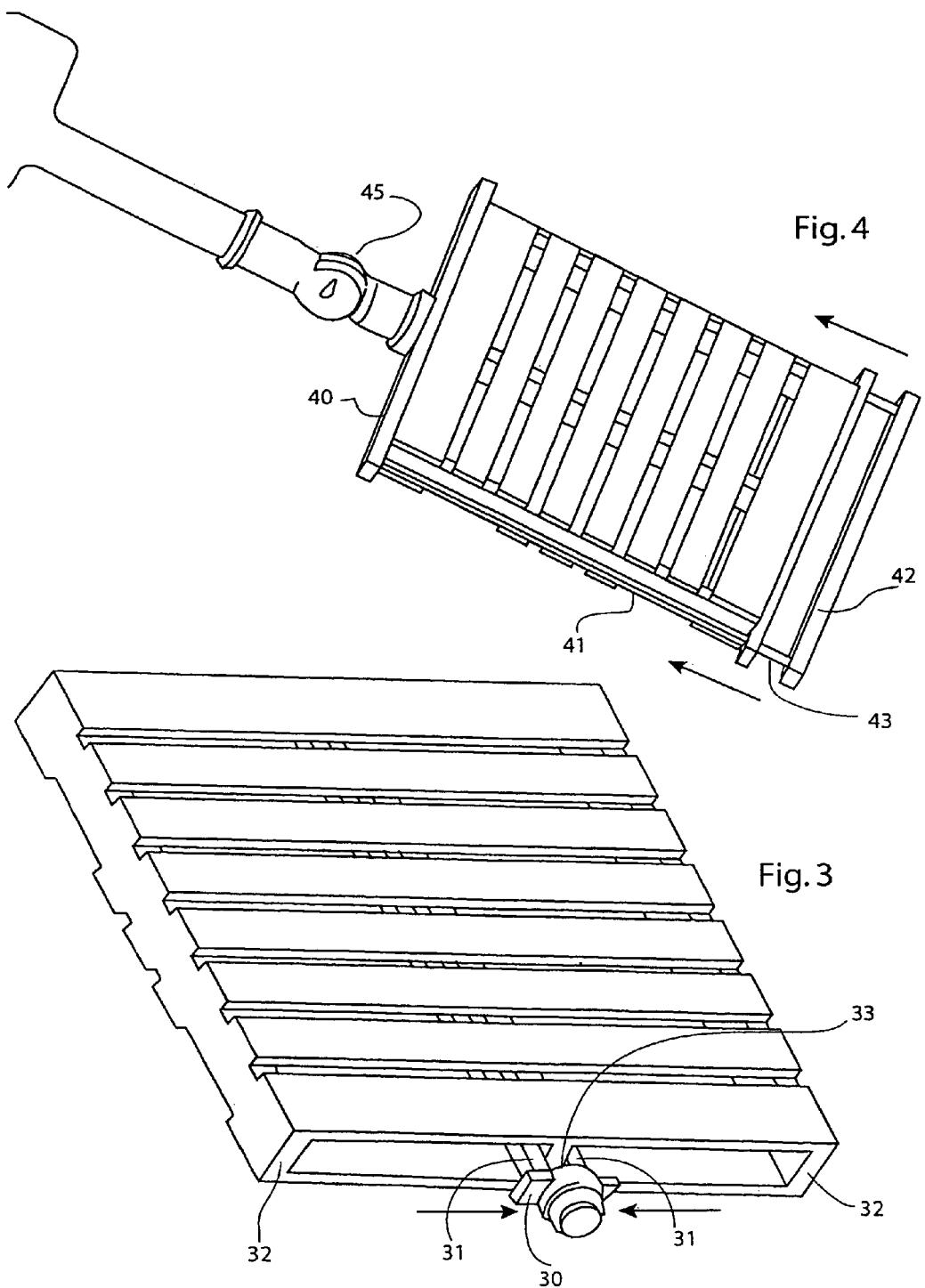
FIG. 3 is a perspective view of a pallet gripping device.
FIG. 4 is a perspective view of an alternate pallet gripping device.

As shown for example in FIGS. 3-7, pallet gripping may take place in a number of ways. As shown in FIG. 3, a gripper 30 having generally full length parallel compressing grips 28 may be inserted between the bearers 32 for the purpose of clamping the central bearer 33 or central blocks.

As shown in FIG. 4, the gripper may take the form of a large rectangular hoop or frame 40, which may be placed around the entire pallet. Such a hoop or frame would then be reduced in size to clamp the pallet securely around its periphery. Size reduction of the hoop or frame is achieved with pneumatic or hydraulic cylinders 41 attached together by an end piece 42. The terminal ends 43 of the arms 41 need not be attached to one another. The gripper or gripping device may include an integral wrist joint or coupling 45, for example as shown in FIG. 4. In other embodiments the gripping device does not include a wrist joint or coupling.

Figure 5:
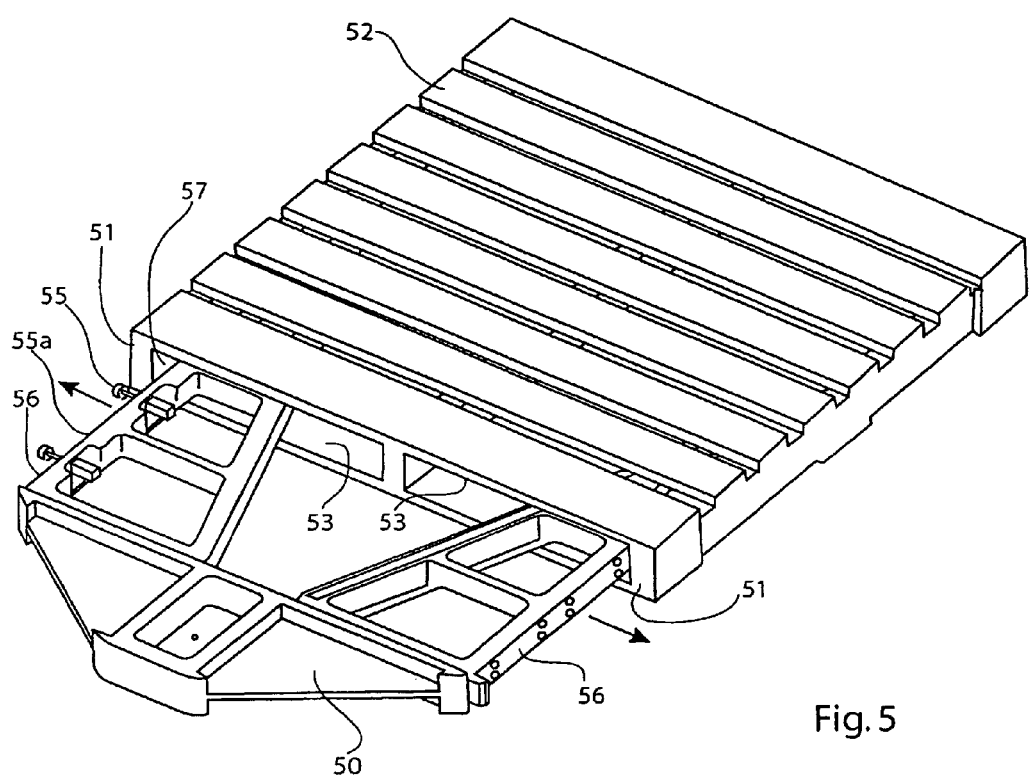
FIG. 5 is a perspective view of a further pallet gripping device.

Alternatively and as shown in FIG. 5 a tensile gripper 50 may be inserted between the bearers 51 and use outward facing actuators 55 to force friction pads to expand outward so as to clamp against the inside edges of the outermost bearers or blocks 51. For example, FIG. 5 shows sensors 55a which sense the presence or proximity of the inside surface of the adjacent bearer, thus confirming proper contact has been made. The sensors may be provided on all required pallet contacting surfaces. In the example of FIG. 5, the contact sensors 55 may be built into the actuators that extend along the exterior lateral contacting surfaces 56. One or more sensors 55a are located in a position corresponding to the closest portion, front opening or mouth of the pallet 57. When this sensor 55a is activated, it confirms that the gripper is fully inserted in the pallet. This concept is extendible to other gripper styles.

The gripper may also expand against the inner faces 53 of the top and bottom deck boards. As shown in FIGS. 6(a) and (b), a tensile gripping device of the type depicted in FIG. 5 may include a rigid body 60 on to which are mounted the lateral actuators 55, sensors 55a etc. The rigid body 61 further comprises a pair of substantially full length tines 62. Each tine has a pair of longitudinal actuators 63. Each longitudinal actuator 63 runs approximately the full length of each tine. When the gripping device 60 is inserted into the pallet, the longitudinal braces or actuators 63 are retracted as shown in FIG. 6(a). When the actuators or braces 63 are extended (eg vertically with regard to a flat pallet), they exert themselves against the interior faces of the top and bottom sides of the pallet. This has a stabilising effect and compliments the action of the lateral actuators 55.

As shown in FIG. 7, another form of exterior gripping device comprises a discontinuous external gripping frame 70. The frame 70 is coupled to the robotic arm at an optional rotatable wrist joint 72. The frame 70 further comprises parallel external arms 73. The pallet fits between the arms 73. Each arm 73 terminates with a compressing device 74. Each compressing device 74 is adapted to compress the pallet against the transverse base 75 of the frame. The compressors 74 are driven toward and away from the pallet by actuators located within or on the arms 73. The compressor 74 may also rotate in the direction of arrow 76, if required, to allow the pallet to be withdrawn from the frame 70 more conveniently.

Inspection

As shown in FIG. 8, an automated inspection table 80 may be used in a stand-alone capacity without the associated repair system, in a quality control system or sorting system. As a quality control system it could be used to determine whether pallets are fit for use (i.e. meet the quality standard for that style of pallet). As a sorting system it could be used to gather data for sorting pallets by type, size, or quality level. Various repair devices and methods are disclosed below. These may be used alone or in combination after either a manual or automatic inspection. The inspection table or station comprises an optional transport system 82 and one or more sensing heads 83.

A pallet feature sensing head may be constructed in different styles. First, it may be constructed with a series of sensors in a line (linear array) to detect the presence or absence of timber (or other pallet material). This type of sensing head would be positioned adjacent to the moving pallet so that it scans the pallet surface passing near it. Such a sensing head would give a two dimensional image or map of pallet characteristic values. The values may be analog or digital. This image can then be analyzed against a set criteria with the identified differences being used to determine if there is pallet damage.

The alternative and preferred method of construction for the sensing head is to use a laser and camera system to capture individual profiles (cross sections) of the pallet (i.e. the camera records the location of a projected laser line and triangulates its position to give height and coordinate data). The laser beam which is projected onto the pallet may be fan shaped or it may be scanned across the pallet surface using, for example, moving mirrors. Such a system will provide three-dimensional data map on the pallet and can be used for detecting gaps or protrusions such as nails, hanging plastic etc. The three dimensional data can be filtered into a two dimensional image of on/off values by using a dynamically created height value, corresponding to a reference plane or set threshold offset above the bearer or connector board surface. The three dimensional data can also be filtered using image analysis algorithms (such as the Sobel or Gaussian filters) to provide locations of protrusions, cracks and other deviations in the pallet element surfaces.

Alternatively similar two or three dimensional maps of pallet features, dimensions and topography may be created using a system of cameras, which may be stereoscopic or monocular in location and action. These can be mathematically manipulated to give data on each element that can then be analysed for damage as in other sensing head arrangements.

As shown in FIG. 8, a robotic arm is capable of placing a pallet requiring inspection into an inspection table 80. Of course, a pallet may be loaded manually or using other means where any robot is not available. The sensing table 80 includes a rigid frame 81 and a pallet transport mechanism 82. The transport mechanism serves as a motorised conveyor which is capable of propelling a pallet and a sensing head 83, preferably at a fixed velocity so that data about the physical dimensions and topography of the pallet may be obtained.

This system will then compile the data about the pallet into a database for use by the other equipment in the cell. This is a form of mapping of features relative to a datum. Data acquired in this way may include the location of protruding nails or other objects, the location of cracks, the location of cracked boards, or misaligned boards or missing boards. Alternatively, an input screen could be provided for an operator to manually or semi-automatically enter the details of the damage to the pallet, and this data would be stored in the database in place of the automatic inspection system data.

Another form of automated inspection device is shown in FIG. 9. As shown there, a conveyor less inspection device 90 comprises a rigid frame 91 which defines a central gap area 92. A lower rigidised support 93 retains a lower upward looking sensing head 94 and an upper horizontal support 95 and an upper downward looking sensing head 96. In this embodiment, each support 93, 95 is reinforced by a pair of braces 97. The braces rigidise the support and also serve to mechanically protect the sensing heads 94, 96. In this form, the automated inspection device does not require a conveying surface. Instead, the pallet is gripped with an appliance or device and then pulled or pushed by the robot through the frame and between the sensing heads 94, 96 along a linear path.

Data in the two dimensional form noted above is sorted into arrays of related points representing each pallet element such as a board, broken board segment, bearer etc. Each element array is then tested against a range of criteria to determine the quality of that element, and whether a pallet component is missing or should be removed or adjusted. In addition, gaps between components or elements are also tested against a range of criteria to determine whether neighbouring pallet elements should be marked for inspection or repair. Decisions made for each element or gap are made in a hierarchical manner—e.g. element removal decisions override element position adjust decisions and so on. When all checks on a particular element have been made, the highest-ranking decision for that element is recorded to a database. Overall pallet analysis is carried out once all elements have been checked and decisions stored to the database. This overall analysis can be used to sort pallets into various styles (eg by number of boards or by a multiple of criteria set points) or into good and bad (eg by number of operations required on pallet), alternatively it can be used to determine whether the pallet is able to be repaired by an automated system or must be sent to a human operator for inspection. If the pallet can be repaired by an automated repair cell, the system generates a recipe of repair tasks for machine control within the repair cell. This recipe is handled by a combination of the Human Machine Interface (HMI) system, the analysis system, the programmable logic controller (PLC) and the robot controller.

As further shown in FIG. 9, a robotic arm 14 is used to transport a pallet through the gap area 92 in a linear fashion and at a relatively constant velocity. After the pallet has been scanned and analysed, it is ready for introduction into a board removal machine 97. Because the robotic arm 14 is located between the inspection station 90 and the board removal machine 97 it is able to transport the pallet without letting go of it.

Board Removal

In preferred embodiments, the board removal machine 97 comprises a form of stationary horizontal band saw. As will be explained, the robotic arm 14 is capable of positioning the pallet in such a way that the blade of the band saw is located between adjacent boards of the pallet. By linearly advancing a pallet toward the blade, the nails or other fasteners which are used to hold a board to its bearers can be cut so that the board can be completely removed. The robot positions the pallet so that the saw cuts from a lower surface. The lower surface during cutting can be the top surface of the pallet if the pallet is inverted by the robot. Where the gap between adjacent boards is too narrow to admit the blade of the band saw, the pallet may be advanced past the band saw 98 to a pry station 98. The robotic arm 14 is used to advance the pallet onto the pry station to the correct depths. As a result of the analysis inspection process, the pallet is inserted so that the pry tables rotating pry lever 99 enter the interior space of the pallet. Rotating the pry arms or levers 99 forces a board to be ejected from a pallet. Subsequently, a milling head of the pry station removes protruding nails.

As shown in FIG. 10, the board removal saw 97 comprises a rigid frame 101 which supports a pair of rotating spools 102. The spools 102 support and transport a moving blade 103 having teeth which face the direction from which the pallet arrives by virtue of the robot arm. The saw blade 104 is narrow enough to fit between most adjacent top boards or bottom boards. In preferred embodiments, the robot is used to invert the pallet so that top boards are removed with the pallet in the inverted position.

In preferred embodiments, the saw 97 includes a pair of blade lifters 105. The lifters are located in positions that correspond to the center of the gaps between adjacent bearers of an inserted pallet. Each blade lifter 105 includes a steel roller 106 which is carried by a pivoting head 107. The pivoting head 107 is carried by a hinge 108 which is attached to a vertical struck 109. An actuator 110 extends between the struck 109 and the pivoting head 107.

As shown in FIG. 11, the rollers 106 can be extended so as to lift the central portion of the blade, as required. In some cutting situations, the central bearer of a pallet, when the pallet is inverted, is higher than the exterior bearers. In this case, the blade lifters are deployed to raise the central part of the blade so that it more closely contacts the central bearer.

As shown in FIG. 12, the lifters 105 can pivot out of the way of an advancing pallet. If an unremoved board of an advancing pallet contacts the rollers 106 the heads 107 can pivot out of the way. They may be returned to their initial position by the actuators 110 so as to return to the position depicted in FIG. 10.

As shown in FIG. 13, the saw 97 includes both vertical and horizontal blade location or proximity sensors. The upper portion of the blade 104 is associated with a vertical deflection measurement device 130 at each end or the cutting portion of the blade. In one embodiment, a laser proximity sensor is used as the vertical deflection measurement device 130. The device 130 projects a beam 131 onto the moving blade 134 and drives a measurement which will be used for the purpose of accurately positioning the pallet with respect to the blade, as will be explained. The blade 104 is also associated with a rotating but resiliently suspended blade follower 132 which is associated with a horizontal deflection measurement device 133. In preferred embodiments, a laser proximity sensor is also used to project a beam 134 onto the blade follower 132. The horizontal deflection measurement device 133 generates a signal from which excessive force on the blade can be determined; When the force on the blade reaches a pre-established threshold, as determined by the deflection measurement device 133, the board removal operation can be stopped or reversed. In preferred embodiments, a vertical deflection measurement device 130 is located at each end at the top portion of the blade 104.

As shown in FIG. 14, a vertical deflection measurement device 130 is located at each end of the working portion of the blade 104. Because of variations in the construction of pallets, bearer thicknesses, warping and etc., it is possible that a pallet will require a level adjustment prior to cutting. Failure to adjust the pallet entry roll angle can cause uneven stress on the blade or a cutting path which removes material unevenly from the pallet. Hence, the robotic arm positions the pallet so that it is inclined with respect to the blade 104. This is shown in FIG. 14(*a*). The robot causes the pallet to roll in one direction with respect to the blade. As shown in FIG. 14(*a*), when rolled, one corner of the pallet will contact one end of the blade. When the pallet contacts the blade as shown in FIG. 14(*a*), the appropriate vertical deflection device will generate a signal from which the inclination of the pallet can be measured as an angle with respect to the blade 104. This same process is repeated by rolling in the other direction as depicted in FIG. 14(*b*) again, a deflection angle is measured by one of the sensors 130. The correct orientation angle for the pallet is determined by adding the 2 angles measured in FIGS. 14(*a*)(*b*) and then determining the average. The pallet is rolled to a position in FIG. 14(*c*) which represents the subtraction of this average from the angular displacement depicted in FIG. 14(*b*).

Lead Board Adjustment

As shown in FIG. 15 and with reference to FIG. 1, the second robot 15 with the internal gripper 60 is associated with a lead board adjustment station 150 and a board replacement station 151. In this example, the lead board adjustment station 150 comprises two modules 152, 153. Each module further comprises a rigid frame 154 that defines a central loading opening 155. The robot 15 inserts the pallet into the opening 155 and lowers the pallet until it makes contact with the lower supporting surfaces 156. Hydraulic actuators 157 associated with each module are capable of adjusting the location of the front and rear lead boards with respect to the bearers. One side of the pallet is adjusted, and then pressed into position using the existing nails. If required and then the robot can be used to withdraw the pallet and reinsert it so that the opposite face of the pallet can have it's front and rear lead boards adjusted. In the alternative the device can reposition and press all four lead boards at once. After the lead boards are adjusted, the robot 15 is used to transport the pallet to the board replacement station 151.

Board Replacement

As shown in FIGS. 16 and 17, the board replacement station 151 comprises a hopper 160 which contains a supply of lead boards 161 as well as intermediate boards 162. A board slide 163 is used to transport the appropriate and selected board to a location beneath an array of board clamps 165 and nail guns 164. A pusher such as a pneumatic or hydraulic actuator 166 is used to advance the selected board along and down the board slide 63 in the repair position.

As shown in FIG. 17, a back stop 170 may be lowered into position to define a margin beyond which a board advanced by the actuator 166 cannot proceed. When the board advances down the slide 163 and contacts the back stop 170 it is considered in position. Once in position, the clamps 165 are actuated. This holds the board in position over the bearers. At this point, the nail guns 164 can be actuated to insert a first set of nails. The robotic arm is then used to reposition the board so that additional nails can be used to attach the replacement board to the 3 bearers.

After going through these machines, the pallet has been inspected and repaired, but may need cleaning to be fit for use. The manipulator will then guide the gripped pallet through a decontamination unit (not shown) that would consist of rotating (or fixed) brushes with dust extraction and a washing system.

When the pallet has been through each of these machines, it will be fit for use. When it is fit for use, the manipulator will move the pallet to an outfeed conveyor section of the cell, the gripper will disengage from the pallet and the pallet will be conveyed (by chain or roller or belt conveyor) away from the repair cell. Pallets may then proceed to a painting machine, if required. The gripper and manipulator will then return to the infeed section of the cell to start the process again on the next pallet.

What is claimed is:

1. A method of automated pallet repair, comprising the steps of:
   using a scanning device to create a three-dimensional data map of a pallet for detecting gaps and protrusions in the pallet, the scanning device generating a laser beam projected onto the pallet;
   filtering the three-dimensional data map into a two-dimensional image of on/off values by using a dynamically created height value, corresponding to a reference plane or set threshold offset above a board surface of the pallet;
   creating a recipe of repair operations from the three-dimensional data map; and
   gripping the pallet and transporting the gripped pallet to one or more repair stations in accordance with the recipe.

2. The method of claim 1, further comprising filtering the three-dimensional data map with a Sobel or Gaussian filter to provide locations of the gaps and protrusions in the pallet.

3. A method of automated pallet repair, comprising the steps of:
   using a scanning device to create a three-dimensional data map of a pallet for detecting gaps and protrusions in the pallet;
   filtering the three-dimensional data map into a two-dimensional image of on/off values by using a dynamically created height value, corresponding to a reference plane or set threshold offset above a board surface of the pallet;

creating a recipe of repair operations from the three-dimensional data map; and transporting the pallet to at least one repair station in accordance with the recipe.

4. The method of claim 3, further comprising filtering the three-dimensional data map with a Sobel or Gaussian filter to provide locations of the gaps and protrusions in the pallet.

5. The method of claim 3, wherein the scanning device generates a laser beam projected onto the pallet.

6. A method of automated pallet repair, comprising the steps of:

using a scanning device to generate a three-dimensional data map of a pallet, the three-dimensional data map including features, dimensions and topography of the pallet;

filtering the three-dimensional data map into a two-dimensional image comprising on/off values by using a dynamically created height value corresponding to a reference plane above a board surface of the pallet;

generating a recipe of repair operations based on the filtered three-dimensional data map; and transporting the pallet to at least one repair station based on the recipe.

7. The method of claim 6, further comprising filtering the three-dimensional data map with a Sobel or Gaussian filter to provide locations of gaps and protrusions in the pallet.

8. The method of claim 6, further comprising gripping the pallet before transporting the pallet to the at least one repair station.

9. A method of automated pallet repair, comprising the steps of:

using a scanning device to generate a three-dimensional data map of a pallet, the three-dimensional data map including features, dimensions and topography of the pallet;

filtering the three-dimensional data map into a two-dimensional image comprising on/off values by using a dynamically created height value corresponding to set threshold offset above a board surface of the pallet;

generating a recipe of repair operations based on the filtered three-dimensional data map; and transporting the pallet to at least one repair station based on the recipe.

10. The method of claim 9, further comprising filtering the three-dimensional data map with a Sobel or Gaussian filter to provide locations of gaps and protrusions in the pallet.

11. The method of claim 9, further comprising gripping the pallet before transporting the pallet to the at least one repair station.

* * * * *